United States Patent [19]
Jaffre

[11] Patent Number: 4,562,920
[45] Date of Patent: Jan. 7, 1986

[54] DEVICE FOR THE PRESSURELESS ACCUMULATION OF LOADS ON ROLLER CONVEYORS

[76] Inventor: Félicien Jaffre, Samovie, Rue Cdt le Prieur Kéryado, Lorient, France, 56100

[21] Appl. No.: 479,910
[22] PCT Filed: Jul. 27, 1982
[86] PCT No.: PCT/FR82/00129
  § 371 Date: Mar. 29, 1983
  § 102(e) Date: Mar. 29, 1983
[87] PCT Pub. No.: WO83/00479
  PCT Pub. Date: Feb. 17, 1983

[30] Foreign Application Priority Data
Jul. 30, 1981 [FR] France ................ 81 15009

[51] Int. Cl.[4] .............................................. B65G 13/06
[52] U.S. Cl. ...................................... 198/781; 198/783
[58] Field of Search .............. 198/781, 789, 790, 791, 198/783, 780

[56] References Cited
U.S. PATENT DOCUMENTS

3,537,568 11/1970 Leach ................................ 198/781
4,212,385 7/1980 Leach ............................. 198/789 X
4,215,775 8/1980 Gebhart ............................ 198/781
4,362,238 12/1982 Rivette ............................ 198/781

FOREIGN PATENT DOCUMENTS

2136869 2/1973 Fed. Rep. of Germany ...... 198/781
2297793 8/1976 France .
616385 3/1980 Switzerland .

Primary Examiner—Joseph E. Valenza
Assistant Examiner—Jonathan D. Holmes
Attorney, Agent, or Firm—Frost & Jacobs

[57] ABSTRACT

A friction driven live roller accumulation conveyor comprises successive load carrying sections each having at least two live rollers and a detector responsive to the presence of a load. At least one of the live rollers of each section has an associated ratchet type blocking device.

The detector of each section and the immediately following section are coupled to the blocking device of each section and the blocking device of the immediately following section.

The live roller associated with the blocking device in a section is blocked only when there is a load in that section and the immediately preceding section. An actuator releases the blocking device in a first or leading section to permit the advancement of loads along the conveyor.

6 Claims, 6 Drawing Figures

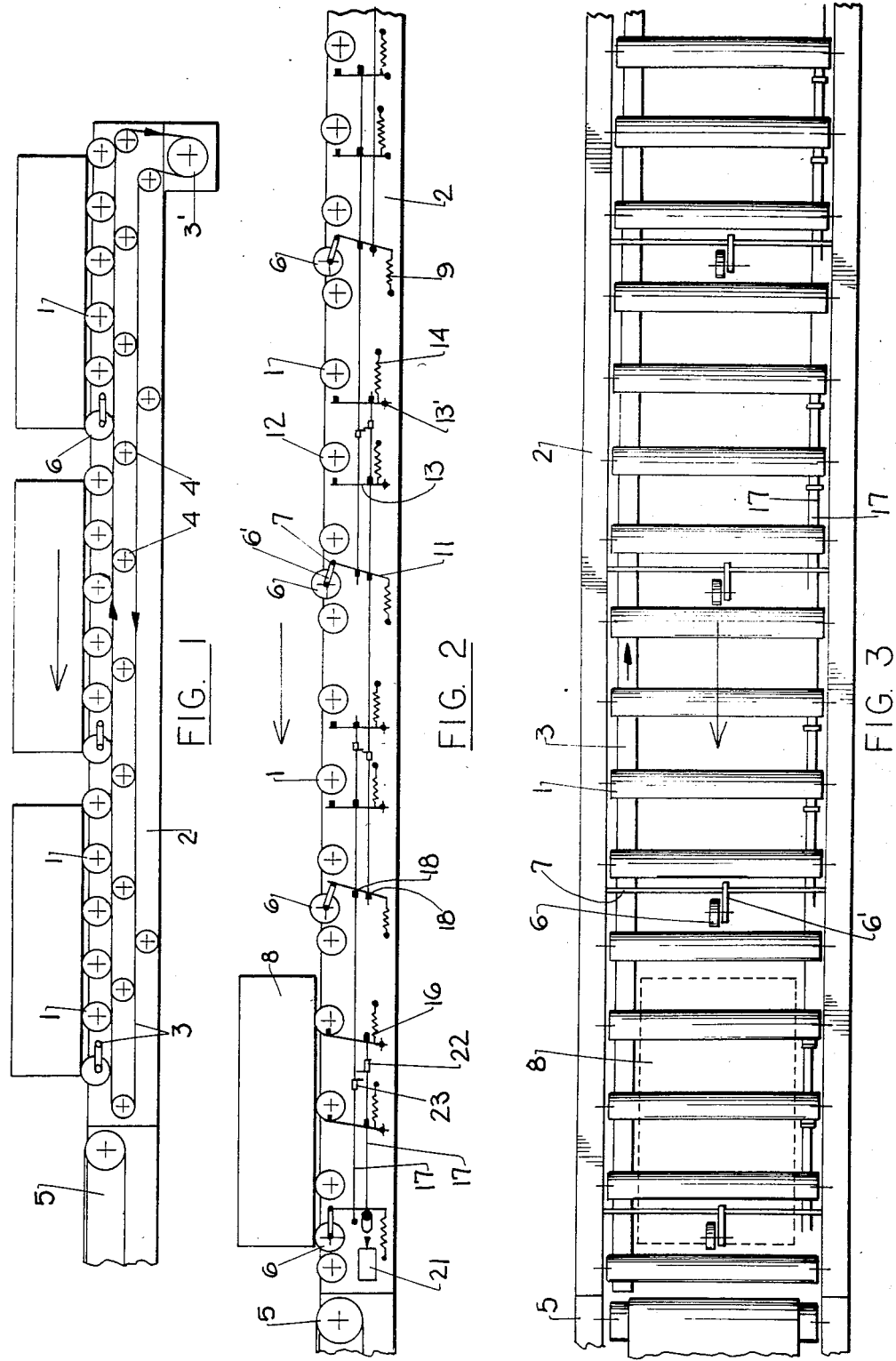

DEVICE FOR THE PRESSURELESS ACCUMULATION OF LOADS ON ROLLER CONVEYORS

BACKGROUND OF THE INVENTION

The present invention relates to improvements in friction-driven live roller conveyors for pressureless accumulation loads, whether regularly spaced or not.

In materials handling the practical interest of accumulating industrial or commercial loads for insuring the regular operation of machines, processing equipment, packaging machinery and the like has long been recognized. Abutment systems are thus known which hold back accumulated loads by contact with a relatively small force.

More recently, conveyors have been proposed comprising successive sections of disengageable friction driven rollers, or chain and sprocket driven rollers. Each section is equipped with a load detector or sensing means which when sensing a load disengages the friction drive or the chain and sprocket drive from the rollers of the section immediately upstream so that these rollers freewheel or rotate freely and the load carried by this section is slowed and then stopped, and so forth. This arrangement which progressively stops loads along the conveyor has the drawback of requiring an adjustment of the device as a function of the weight of the loads and therefore does not permit the conveyor from handling loads which vary in weight and size from one to another. In addition, the stopping of a load in a section remains uncertain as does satisfactory accumulation operation.

SUMMARY OF THE INVENTION

To prevent the above inconveniences, an object of the invention is to improve such live roller conveyors for pressureless accumulation, in particular by giving them greater versatility of use and enabling them to transport loads of different size and weight, whether individualy or in containers, or even empty containers.

Another object of the invention is to provide such results with reduced investment, maintenance and operating costs.

According to the improvements of the invention, the rollers of the load carrying sections are blocked against rotation by the load itself, and the sections of the conveyor are arranged so that in the rest condition the means blocking against rotation the rollers of one loaded section are simultaneously retained by the sensing means for the section and by sensing means for the section immediately downstream thereof. Means are provided in a first or leading section of a group of accumulation sections for releasing the rollers to restart the conveyor.

According to a first embodiment of the invention a friction driven, disengageable, roller conveyor includes sections, each of which is equipped with a load sensing means which when detecting a load disengages the rollers of the section immediately upstream so that the section is free wheeling. The conveyor is characterized first by the fact that each section has a pawl and ratchet or slotted wheel associated with the rollers thereof for blocking them against rotation, and second by coupling the blocking means of two consecutive sections, with the load sensing means for these sections so that the rollers of the upstream loaded section can only be blocked against rotation when the downstream section is itself loaded. On the other hand, when the sensing means is in the rest position it holds the pawl in position permitting the rotation of the rollers.

According to another feature of the invention, there is provided at the head of the first accumulation section, means such as a hydraulic or electromagnetic actuator for driving the means for blocking the rollers of the leading first accumulation section in order to restart the conveyor.

In an alternative embodiment, the various sections are modular sections and may comprise a plurality of rollers surrounded by a continuous belt, some of the rollers being friction driven and equipped with releasable means for blocking the rollers against rotation.

Various embodiments of the invention will be described with reference to the accompanying drawings.

BRIEF DESCRIPTION OF THE DRAWINGS

FIG. 1 is a diagrammatic longitudinal sectional view of a load accumulation conveyor formed by roller sections.

FIG. 2 is a diagrammatic longitudinal sectional view schematically illustrating the controls of the conveyor.

FIG. 3 is a diagrammatic plan view of the conveyor.

DESCRIPTION OF THE PREFERRED EMBODIMENTS

Figure 4:
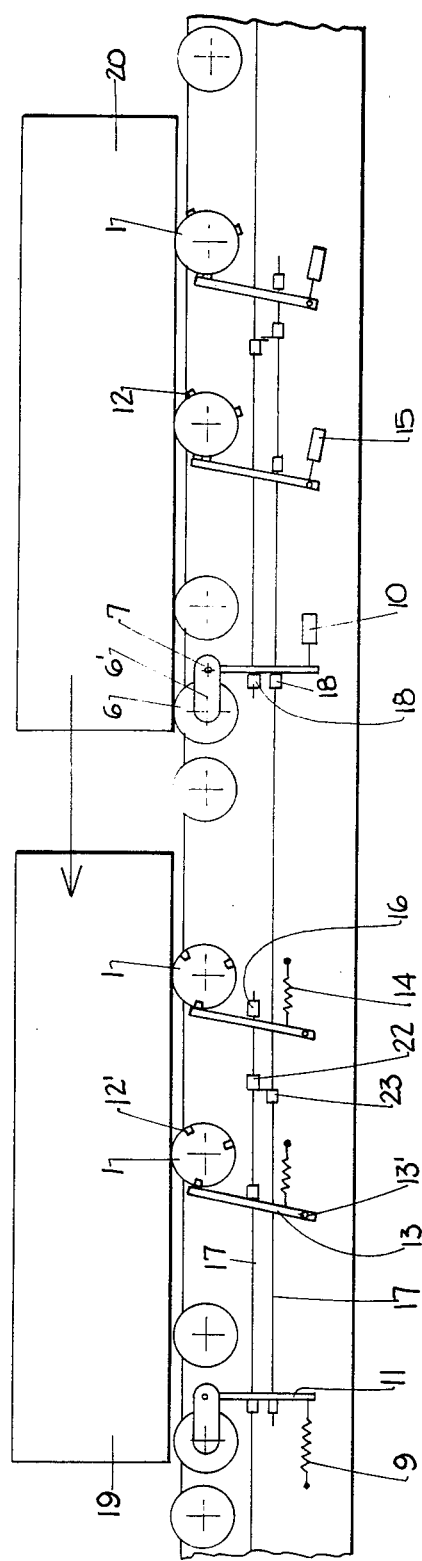
FIG. 4 is a larger scale view of the accumulation conveyor starting up.

As shown in FIGS. 1–4, the live rollers 1 of the accumulation conveyor are friction driven tangentially by a belt 3 applied by press rollers 4 against rollers 1, the belt being driven by a motor 3'. In the FIGS. 1–4 embodiment, the loads carried by the conveyor 2 to the first or leading section thereof are transferred to a belt conveyor 5 at the operating speed of the system. The loads may be of a variety of dimensions, weight, shape and consistency depending on the size of the apparatus, the roller spacing and the drive force. The conveyor is designed as a function of the limit characteristics of the loads to be conveyed.

One sensing means 6 per roller section is provided, the sections being defined by the distance between consecutive sensing means. Each sensing means 6 protrudes slightly above the upper plane tangent to the rollers and comprises a lever 6' pivotally mounted about a spindle 7 transverse to the path of movement of the conveyor. Each lever 6' is lowered by pivoting about its spindle 7, when a load 8 passes over the sensing means 6, against the bias of a spring 9 or a counterweight 10. Each sensing means 6 is equipped with a link 11 which has one of two positions depending on whether or not the sensing means detects a load 8 in the associated section of the conveyor.

All the rollers 1, or only some of them have near one of their ends a ratchet wheel 12 or slotted wheel 12' having ratchets or slots over all or part of the periphery thereof, as best shown in FIG. 4. A pawl 13, pivoted at 13' on the frame and biased by spring 14 or counterweight 15, is urged toward the ratchet wheel 12 or slotted wheel 12' of the associated roller 1 for selective engagement with the corresponding ratchets or slots thereof. The pawl 13 in each section is controlled by abutment 16 fixed on the cable or a connecting rod 17, in association with two links 11 located downstream of the pawl 13. On the other hand, the cable or connecting rod 17 is retained by two abutments 18 fixed thereon and bearing against the links 11.

Accordingly, when two loads 19 and 20 simultaneously actuate the sensing means 6 of two consecutive sections by depressing them, the links 11 of the associated sections release the cable or connecting rod 17, and the pawls 13, urged by their springs 14, come into contact with the periphery of their respective ratchet wheels 12 or slotted wheels 12' in the section carrying load 20 and come into engagement with the next ratchet or slot which immediately blocks the associated rollers 1 against rotation. The drive belt 3 then slips on the rollers blocked against rotation in the section carrying load 20. Similarly, the loads upstream of section carrying load 20 are stopped in succession provided that the section immediately downstream of such a load is occupied by another load. This provides accumulation of loads over an upstream part of the conveyor starting from a first or leading section of the conveyor.

If load 19 is made to move ahead along conveyor 5, it moves out of the way of the sensing means 6 in the section it previously occupied, and the sensing means 6 resumes its rest or protruding position under the action or bias of spring 9 or counterweight 10. The sensing means 6 returns the cable or connection rod 17 through abutments 18, thereby freeing the rollers of the upstream section carrying load 20 from the force exerted by abutments 16 against pawls 13. The rollers 1 are once again driven by belt 3 and load 20 is transported forwardly downstream. Thus a "cascade" effect is produced each time a load moves away from the sensing means of the section where it was previously stationed.

It will be noted that if a load is removed from a section, e.g. load 20, without changing the position of load 19, the loads of the sections behind or upstream of the previous position of load 20 will move successively into position behind load 19 thereby taking up the place vacated by load 20.

To start up the forward movement of the stored loads when a first or leading load moves forward, an actuator 21 may be manually operated or operated by an electromagnet or a hydraulic jack to exert the necessary traction on cable or connecting rod 17 to free the rollers 1 for rotation. The actuator 21 may be controlled by the conveyor 5 (or through a machine or other device) depending on the requirements of the apparatus and the operation thereof. Actuator 21 may, for example, comprise a slotted elongated head in which the abutment 18 may be freely displaced. When the sensing means is depressed under a load, the abutment 18 will be displaced the distance necessary for the engagement of the pawls 13 with the ratchet wheels 12 or slotted wheels 12'.

To simultaneously restart the forward movement of two or more loads, an abutment 22 fixed to cable or connecting rod 17 in a downstream section returns the cable or connecting rod 17 of the immediately following upstream section, by means of an abutment 23 fixed to the cable downstream of abutment 22, when a traction force is exerted on cable or connecting rod 17 in the downstream section.

Figure 5:
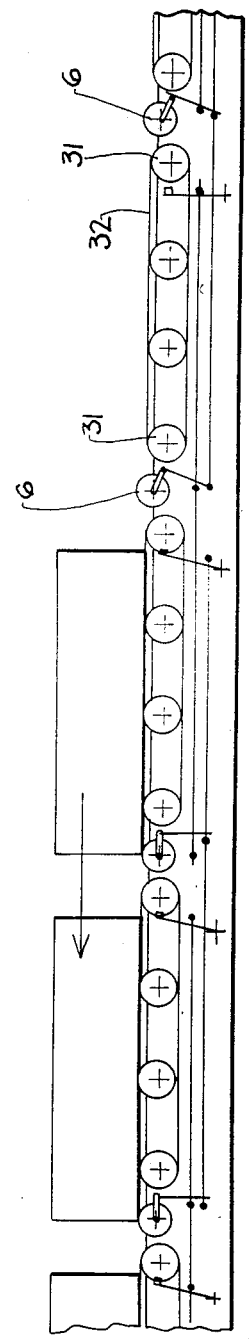
FIG. 5 is a diagrammatic view of a modular embodiment of the invention.

In the embodiment illustrated FIG. 5, each roller section defines a modular section comprising at least two rollers 31 around which is tensioned a belt 32 which the rollers drive. A sensing means 6 is mounted at the downstream end of each of the modular sections. As in the embodiment of FIGS. 1-4, the sensing means are connected to each other in pairs by means of links 11 and abutments 16 and 18.

Under these circumstances, the rollers 31 of a modular section are either blocked against rotation or free wheeling when the corresponding sensing means of two consecutive modular sections are either depressed simultaneously by a load or released by the departure of a load. This modular embodiment provides the accumulation conveyor of more versatile and quieter operation than that of the preceding embodiment.

The improvements of the invention of pressureless accumulation conveyors have the sought-after advantages of reliability, great possibilities of use, versatility and low cost from the standpoint of both maintenance and construction. As regards the latter point in particular, the accumulation conveyors do not require the numerous expensive individual means such as motors for each section or means for disengaging each of the rollers, which are needed in the absence of the improvements according to the invention.

It is, of course, clear that the mechanical sensing means and or the means for rotationally blocking and releasing the rollers may be substituted by other mechanical, electrical, hydraulic an or pneumatic means equivalent to the described and illustrated means without departing from the scope of the present invention.

What is claimed is:

1. An accumulator conveyor for transporting loads from an upstream end to a downstream end comprising:
   a plurality of rollers in direct contact with said loads, said rollers forming sucessive load carrying sections from said upstream end to said downstream end;
   at least one endless belt in direct contact with said rollers for frictionally driving said rollers;
   each of said load carrying sections having: a sensing means responsive to said load in a downstream corresponding section, said sensing means being pivotable about an axis parallel to said plurality of rollers and comprising a link, and means biasing said sensing means to a rest position; a means for blocking at least one of said rollers against rotation in each of said load carrying sections, said means for blocking including a pivotal pawl lockingly engagable with a complimentary roller comprising one of said plurality of rollers, said pawl being out of engagement with said complimentary roller in the rest position and means biasing said pawl into engagement with said complimentary roller in said blocking position; and elongated connecting means coupled to said sensing means and to said means for blocking, and coupled to said sensing means and said means for blocking in said downstream corresponding section so that said rollers in each of said load carrying sections can only be blocked against rotation when an adjacent downstream corresponding section is itself loaded, said complimentary roller including a ratchet wheel; said elongated connecting means including an abutment affixed to said connecting means for bearing forwardly against said pawl in the rest position of said sensing means, said connecting means further comprising abutments affixed thereto for engagement with said link of said sensing means and said link of said sensing means of said downstream corresponding section.

2. The conveyor of claim 1, wherein actuator means are provided in a first or leading load carrying section of said conveyor for disengaging said means for blocking in said first or leading section for restarting said conveyor.

3. The conveyor of claim 1, wherein each of said load carrying sections comprises a belt driven by two drive rollers, and said sensing means being disposed between two consecutive load carrying sections and outside the confines of said belt driven by said two drive rollers.

4. An accumulator conveyor for transporting loads from an upstream end to a downstream end comprising:
   a plurality of rollers in direct contact with said loads, said rollers forming successive load carrying sections from said upstream end to said downstream end;
   at least one endless belt in direct contact with said rollers for frictionally driving said rollers;
   each of said load carrying sections having: a sensing means responsive to said load in a downstream corresponding section, said sensing means being pivotable about an axis parallel to said plurality of rollers and comprising a link, and means biasing said sensing means to a rest position; a means for blocking at least one of said rollers against rotation in each of said load carrying sections, said means for blocking including a pivotable pawl lockingly engagable with a complimentary roller comprising one of said plurality of rollers, said pawl being out of engagement with said complimentary roller in the rest position and means biasing said pawl into engagement with said complimentary roller in said blocking position; and elongated connecting means coupled to said sensing means and to said means for blocking, and coupled to said sensing means and said means for blocking in said downstream corresponding section so that said rollers in each of said load carrying sections can only be blocked against rotation when an adjacent downstream corresponding section is itself loaded, said complimentary roller comprising a slotted wheel; said elongated connecting means including an abutment affixed to said connecting means for bearing forwardly against said pawl in the rest position of said sensing means, said connecting means further comprising abutments affixed thereto for engagement with said link of said sensing means and said link of said sensing means of said downstream corresponding section.

5. The conveyor of claim 4, wherein actuator means are provided in a first or leading load carrying section of said conveyor for disengaging said means for blocking in said first or leading section for restarting said conveyor.

6. The conveyor of claim 4, wherein each of said load carrying sections comprises a belt driven by two drive rollers, and said sensing means being disposed between two consecutive load carrying sections and outside the confines of said belt driven by said two drive rollers.

* * * * *